(12) United States Patent
Andonian

(10) Patent No.: US 6,834,261 B1
(45) Date of Patent: Dec. 21, 2004

(54) SIMULATED STEERING FEEL SYSTEM

(75) Inventor: Brian James Andonian, Livonia, MI (US)

(73) Assignee: Visteon Corporation, Dearborn, MI (US)

( * ) Notice: Subject to any disclaimer, the term of this patent is extended or adjusted under 35 U.S.C. 154(b) by 759 days.

(21) Appl. No.: 09/698,395

(22) Filed: Oct. 27, 2000

(51) Int. Cl.[7] .............................................. G06G 7/48
(52) U.S. Cl. .................... 703/7; 703/8; 273/442
(58) Field of Search .................. 703/7, 8; 403/37; 180/446; 701/41, 42; 273/442

(56) References Cited

U.S. PATENT DOCUMENTS

| | | | |
|---|---|---|---|
| 4,629,952 A | 12/1986 | Shimizu | |
| 4,830,127 A | 5/1989 | Ito et al. | |
| 4,949,119 A | * 8/1990 | Moncrief et al. | ............... 703/8 |
| 4,951,199 A | 8/1990 | Whitehead | |
| 4,956,590 A | 9/1990 | Phillips | |
| 5,067,576 A | 11/1991 | Bober | |
| 5,205,371 A | 4/1993 | Karnopp | |
| 5,247,441 A | 9/1993 | Serizawa et al. | |
| 5,251,135 A | 10/1993 | Serizawa et al. | |
| 5,273,129 A | * 12/1993 | Wright et al. | ............... 180/407 |
| 5,347,458 A | 9/1994 | Serizawa et al. | |
| 5,761,627 A | 6/1998 | Seidel et al. | |
| 5,803,202 A | * 9/1998 | Bohner et al. | ............... 180/443 |
| 5,823,876 A | * 10/1998 | Unbehand | ..................... 463/37 |
| 5,923,096 A | 7/1999 | Manak | |
| 5,991,671 A | 11/1999 | Nishiwaki | |
| 5,999,870 A | 12/1999 | Tatsumi et al. | |

FOREIGN PATENT DOCUMENTS

| | | |
|---|---|---|
| DE | 41 10 148 A 1 | 3/1991 |
| DE | 44 04 648 A 1 | 8/1994 |

* cited by examiner

*Primary Examiner*—Albert W. Paladini

(57) ABSTRACT

A simulated steering feel system 10 for use in a vehicle, Laboratory Simulator, or entertainment device employs a servo disk motor 14. The servo disk motor 14 is utilized to import improved torque feedback to a steering wheel or input device.

15 Claims, 1 Drawing Sheet

SIMULATED STEERING FEEL SYSTEM

TECHNICAL FIELD

The present invention relates generally to a simulated steering feel system and more particularly to a simulated steering feel system utilizing a servo disk motor.

BACKGROUND OF THE INVENTION

The use of simulated steering feel systems (SSFS) is well known in the prior art. SSFS's are presently used for a variety of applications including automotive drive simulators, engineering research tools, and entertainment devices. In addition, as advancements in automotive design continue to progress, advancements such as steer by wire (SBW) will likely require SSFS's in order to provide "road feel" or feedback response to a driver.

Although new improved uses of SSFS's will continue to develop, current SSFS can have undesirable characteristics. Current SSFS designs commonly use conventional brush or brushless electric motors. Such conventional electric motors can have disadvantages. Often conventional electric motors add undesirable weight to the SSFS's. Application work requirements can also lead to the need for undesirably large and heavy conventional motors. The high inertia of some conventional motors can also limit the acceleration capabilities of conventional motors and thereby limit the performance characteristics of the SSFS's in which they are used. In addition, conventional motors can create torque ripple or "cogging" effects which are highly undesirable.

It would, therefore, be highly desirable to have a simulated steering feel system with reduced size and weight and that contains further improvements over present SSFS designs utilizing conventional brush or brushless motors.

SUMMARY OF THE INVENTION

It is therefore an object of the present invention to provide a simulated steering feel system that allows for reduced size, increased performance, and eliminates cogging.

In accordance with the objects of the present invention, a simulated steering feel system is provided. A simulated steering feel system includes a servo disk motor. The servo disk motor is utilized to allow feedback torque to a steering wheel. Using this servo disk motor, road feel can be imparted to the steering wheel from a small reduced weight package with improved performance.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
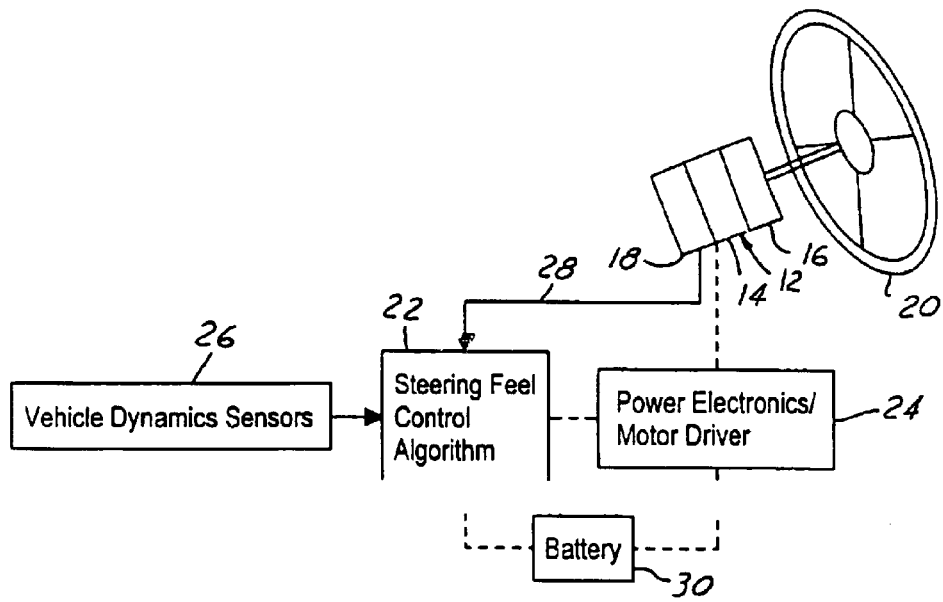
FIG. 1 is an embodiment of a simulated steering feel system in accordance with the present invention for use in an automobile.

Referring now to FIG. 1, which is an illustration of an embodiment of a simulated steering feel system 10 in accordance with the present invention. The embodiment illustrated in FIG. 1 is preferably for use in an automobile to be used in conjunction with the steer by wire system, although the illustrated embodiment can be used in conjunction with any automotive system where simulated steer feel is desired. In an alternate embodiment, whose descriptions will follow, the simulated steering feel system 10 can be used in a variety of applications, including applications independent of an automobile.

The simulated steering feel system 10 includes a servo disk actuator 12. In its basic form, the servo disk actuator 12 includes at least one servo disk motor 14. Servo disk motors are well known in the electronics industry. Servo disk motors are also commonly referred to as disk motors, printed circuit board motors, or pancake motors. One advantage of using a servo disk motor, is that servo disk motors provide higher torque with a smaller package than conventional electric motors. In addition, servo motors do not suffer from torque ripple or cogging effects commonly found in conventional electric motors. Servo disk motors also provide smoother torque with improved acceleration. Although the servo disk actuators 12 can include only a servo disk motor 14, alternate embodiments may include additional components.

In one embodiment, the servo disk actuator 12 can additionally include a torque multiplier 16. Torque multipliers are well known in the prior art. Torque multipliers 16 commonly consist of pulleys, belts, or gear reducers, although a variety of torque multipliers 16 are known. It is known that torque multipliers 16 can be combined with servo disk motors 14 to magnify the torque generated by the servo disk motor 14. It is known that torque multipliers 16 are available in a variety of reduction ratios. Common ranges of reduction ratios vary from 10:1 to 100:1, although additional reduction ratios are possible.

In still another embodiment, the servo disk actuator 12 can include a steering wheel sensor 18. The steering wheel sensor 18 can be utilized to measure a variety of characteristics of a steering wheel 20 including, but not limited to, angle, velocity, acceleration, and torque of the steering wheel 20. In other embodiments, the steering wheel sensor 18 and the steering wheel 20 may be replaced by any known input device sensor (not shown) and corresponding input device (not shown) such as a joystick or similar game device.

The simulated steering feel system 10 can further include a steering feel control processor 22. In one embodiment, the steering feel control processor is a dedicated processor utilized to control the servo disk motor 14. In alternate embodiments, the steering feel control processor was simply the function of a larger automotive computer system.

Although the steering feel control processor 22 can be utilized to directly control the servo disk actuator 12, in alternate embodiments, a motor driver element 24 may be used in conjunction with the steering feel control processor 22 to control and power the servo disk motor 14. The simulated steering feel system 10 can additionally include at least one vehicle dynamic sensor 26. Vehicle dynamic sensors 26 can be used in a variety of automotive environmental conditions, including but not limited to, vehicle speed, vehicle acceleration, tire load, road feel, external temperature, surface friction, wheel slip angle, and wheel position. The steering feel control processor 22 uses information provided by the vehicle dynamic sensors 26 to determine an appropriate feedback torque or "road feel". The steering control processor 22 then utilizes servo disk actuator 12 to impart such "road feel" to the steering wheel 20 or other input device.

In an alternate embodiment, the steering feel control processor 22 may further receive steering wheel information 28 from the steering wheel sensor 18 and use this information in combination with the information provided by vehicle dynamic sensors 26 to create a closed loop system wherein "road feel" is further improved.

The use and feel of such steering feel control processors is well known in the prior art. Although the simulated steering feel system 10 may be powered by a variety of sources, in one preferred embodiment, the simulated steering feel system 10 is powered by an automotive battery 30.

Figure 2:
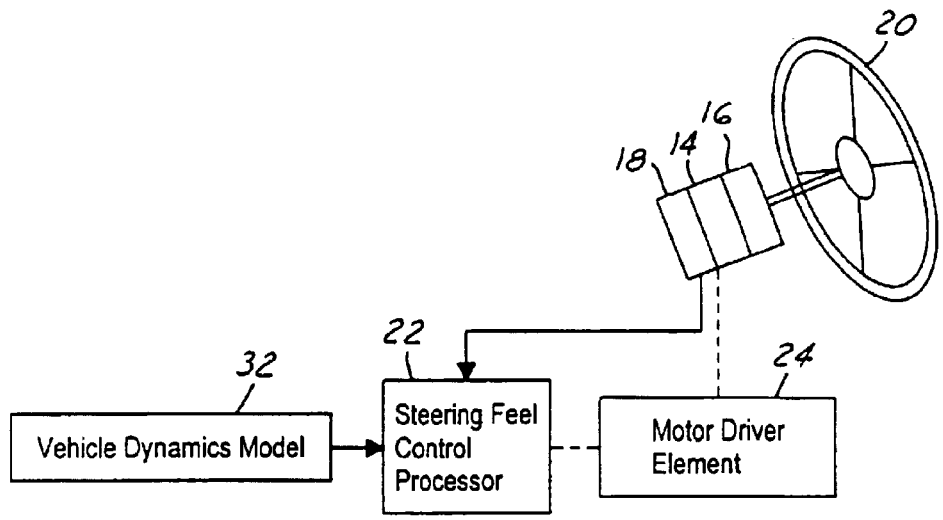
FIG. 2 is an embodiment of a simulated steering feel system in accordance with the present invention for use in a driving simulator.

Although the simulated steering feel system 10 has thus far been described in terms of an in vehicle system, the simulated steering feel system 10 can be used in a variety of other applications. Such additional applications can include, but are not limited to, laboratory testing of steering feel tuning, automotive driving simulators, or entertainment devices (such as arcade games or home entertainment units). When used in such applications, a steering feel control processor 22 can be any controlling computer device. In addition, vehicle dynamic sensors 26 can be replaced by vehicle dynamic models 32, or other informational sources containing information on "road feel" (see FIG. 2). The vehicle dynamic models 32 can consist of automotive performance models or gaming simulation data, or a variety of other informational sources. In addition, in these embodiments, it is contemplated that the simulated steering feel system 10 may be supplied by any acceptable power source.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An simulated steering feel system comprising:
   an input device positioned within an automobile;
   a servo disk motor in communication with said input device;
   a vehicle dynamics element; and
   a steering feel control processor in communication with said servo disk motor and said vehicle dynamics element, said a steering feel control processor generating a feedback torque based on information from said vehicle dynamics element, said servo disk motor imparting said feedback torque onto said input device;
   wherein said input device is part of a steer by wire system, said input device having no mechanical steering connection.

2. A simulated steering feel system as described in claim 1 wherein said vehicle dynamics element comprises at least one vehicle dynamic sensor.

3. A simulated steering feel system as described in claim 1 further comprising:
   a torque multiplier positioned between said input device and said servo disk motor, said torque multiplier magnifying said feedback torque generated by said servo disk motor before imparting onto said input device.

4. A simulated steering feel system as described in claim 3 wherein said torque multiplier is a gear reducer.

5. A simulated steering feel system as described in claim 1 wherein said input device is a steering wheel.

6. A simulated steering feel system as described in claim 1 further comprising:
   a steering wheel sensor element in communication with said input device, said steering wheel sensor element communicating movement of said input device to said steering feel control processor.

7. A simulated steering feel system as described in claim 1 further comprising:
   a motor driver element positioned between said steering feel control processor and said servo disk motor, said motor driver element utilized to operate said servo disk motor.

8. A simulated steering feel system comprising:
   a steering wheel positioned within an automobile, said steering wheel part of a steer by wire system, said steering wheel having no mechanical steering connection;
   a servo disk motor in communication with said steering wheel; and
   a vehicle dynamics element; and
   a steering feel control processor in communication with said servo disk motor and said vehicle dynamics element, said a steering feel control processor generating a feedback torque based on information from said vehicle dynamics element, said servo disk motor imparting said feedback torque onto said steering wheel;
   a torque multiplier positioned between said steering wheel and said servo disk motor, said torque multiplier to relay said feedback torque from said servo disk motor to said steering wheel to impart road feel;
   wherein said steering wheel is part of a steer by wire system, said steering wheel having no mechanical steering connection.

9. A simulated steering feel system as described in claim 8 wherein said torque multiplier is a gear reducer.

10. A simulated steering feel system as described in claim 8 wherein said vehicle dynamics element comprises at least one vehicle dynamic sensor.

11. A simulated steering feel system as described in claim 8 further comprising:
    a steering wheel sensor element in communication with said steering wheel, said steering wheel sensor element communicating movement of said steering wheel to said steering feel control processor.

12. A simulated steering feel system as described in claim 8 further comprising:
    a motor driver element positioned in between said steering feel control processor and said servo disk motor, said motor driver element utilized to operate said servo disk motor.

13. A method of creating simulated steering feel comprising:
    monitoring vehicle dynamic sensors positioned within an automobile;
    utilizing a steering feel control processor to develop a feedback torque based on said vehicle dynamic sensors;
    communicating said feedback torque from said steering feel control processor to a servo disk motor; and
    transmitting said feedback torque onto a steering wheel using said servo disk motor.

14. A method of creating simulated steering feel as described in claim 13 wherein determining appropriate feedback torque comprises the steps of measuring vehicle dynamics characteristics; and
    imputing an appropriate feedback torque using said vehicle dynamic characteristics.

15. A method of simulating steering feel as described in claim 13 further comprising the step of increasing the output of said servo disk motor using a gear reducer, said gear reducer positioned between said servo disk motor and said steering wheel.

* * * * *